US008796445B2

(12) United States Patent
Timmermans et al.

(10) Patent No.: US 8,796,445 B2
(45) Date of Patent: Aug. 5, 2014

(54) ACYLATION OF CARBOHYDRATES

(75) Inventors: Johannes Wilhelmus Timmermans, Ede (NL); Jan Matthijs Jetten, Zeist (NL); Theodoor Maximiliaan Slaghek, Rotterdam (NL); Ingrid Karin Haaksman, Amersfoort (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 22 days.

(21) Appl. No.: 12/744,297

(22) PCT Filed: Nov. 21, 2008

(86) PCT No.: PCT/EP2008/066034
§ 371 (c)(1),
(2), (4) Date: Aug. 30, 2010

(87) PCT Pub. No.: WO2009/065948
PCT Pub. Date: May 28, 2009

(65) Prior Publication Data
US 2011/0015385 A1 Jan. 20, 2011

(30) Foreign Application Priority Data

Nov. 22, 2007 (EP) .................... 07121331

(51) Int. Cl.
*C08B 31/02* (2006.01)
*C08B 33/02* (2006.01)
*C08B 35/02* (2006.01)

(52) U.S. Cl.
USPC ........................................ 536/110

(58) Field of Classification Search
None
See application file for complete search history.

(56) References Cited

U.S. PATENT DOCUMENTS

| 5,747,635 | A  | 5/1998 | Kroner et al. |
| 6,231,675 | B1 | 5/2001 | Chiu et al. |
| 6,451,121 | B2 | 9/2002 | Chiu et al. |
| 6,746,542 | B1 | 6/2004 | Lorencak et al. |

FOREIGN PATENT DOCUMENTS

| AT | 250 388 | 12/1989 |
| EP | 0 333 292 A1 | 9/1989 |
| EP | 0 893 451 A2 | 1/1999 |
| GB | 815358 | 6/1959 |
| WO | WO 00/05319 A1 | 2/2000 |
| WO | WO 00/60167 A1 | 10/2000 |
| WO | WO 2004/104048 A1 | 12/2004 |

OTHER PUBLICATIONS

Tang et al. Canadian Agricultural Engineering vol. 42, No. 1, Jan./Feb./Mar. 2000, pp. 6.1-6.13.*
International Search Report mailed Dec. 30, 2008 received in PCT/EP2008/066034.
Wing, Robert, E., "Starch Citrate: Preparation and Ion Exchange Properties", Starch/Starke 48, 1996, pp. 275-279.

* cited by examiner

*Primary Examiner* — Layla Bland
(74) *Attorney, Agent, or Firm* — Gilberto M. Villacorta; Sunit Talapatra; Foley & Lardner LLP

(57) ABSTRACT

Esterification of a carbohydrate using an acylating agent can effectively be performed using a process comprising:
(a) combining the carbohydrate with the acylating agent,
(b) adjusting the moisture content of the combination below 40 wt. %, and
(c) subjecting the combination to superheated steam.
The carbohydrate is especially starch and the acylating agent is in particular an acid, such as an organic acid, amino acid, or diacid.

9 Claims, No Drawings

ACYLATION OF CARBOHYDRATES

The invention is concerned with producing acylated polysaccharide derivatives and with novel derivatives thus produced.

BACKGROUND

Acylated derivates of polysaccharides, in particular starch, are important materials since acylation introduces useful functionalities, such as decreased or increased hydrophilicity, ionic functions, coupling functions, crosslinking, etc. Acylation is conventionally performed by treating the polysaccharide with an acylating agent such as an acyl halide or an acid anhydride. These acylating agents are typically more expensive and less environment-friendly than the acids themselves, and, moreover, these acylations result in an equivalent amount of a salt, according to the following reaction:

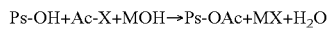

Ps-OH+Ac-X+MOH→Ps-OAc+MX+H$_2$O (Ps=polysaccharide residue; Ac=Acyl group; X=anionic group such as chloride, bromide, acetate; M=metal such as sodium).

Therefore, there is a need for more cost-effective methods of acylating starch and other polysaccharides, which do not produce substantial amounts of undesired by-products such as salts.

GB 815,358 discloses a process for treating starch with various etherifying or esterifying agents under dry conditions using e.g. nitrogen or superheated steam for fluidising the starch. The esterifying agents are anhydrides and acid chlorides, which still require the presence of neutralising agents.

U.S. Pat. Nos. 6,231,675 and 6,451,121 disclose thermally inhibited starches which are prepared by dehydrating a granular starch, using an alcohol, at a pH of about 9.5, and heat treating the dehydrated starch up to 20 h at 120-180° C.

Wing (*Starch* 48 (1996) 275-279) describes the production starch citrate by heating starch with citric acid at 110-140° C. for 24 h. Best results were obtained at low pH using phosphate catalysis.

WO 2004/104048 discloses a process for esterifying starch with acidified amino acids such as betaine and carnitine under dry conditions in an oven at 140° C. for 24 h. The products are water-soluble, which indicates that the starch is degraded during the process.

DESCRIPTION OF THE INVENTION

It was found that esterification of carbohydrates can be effectively performed by treating the carbohydrate with an acylating agent, in a process comprising:
(a) combining the carbohydrate with said acylating agent,
(b) adjusting the moisture content of the combination below 40 wt. %, and
(c) subjecting the combination to superheated steam.

As used herein, the terms 'esterification' and 'acylation' are interchangeable. The terms are used to indicate the process of reacting a hydroxyl group OH (or a sulphydryl group SH or amino group NH or) of a carbohydrate with the acyl group of an acylating agent (which may be an acid, ester, etc. as defined below), to produce an ester (or thioester or amide) function at the carbohydrate.

The carbohydrate may be a monosaccharide, disaccharide, oligosaccharide or polysaccharide. Also, common analogues of carbohydrates, such as amino or acylamino carbohydrates, acylated carbohydrates, uronic acids, etc., can be treated with the process of the invention. Examples of monosaccharides comprise glucose, xylose, galactose, fructose and the like. Disaccharides include e.g. sucrose, maltose, lactose, lactobionic acid etc. Oligosaccharides include galacto-oligosaccharides (α- or β-), fructo-oligosaccharides, malto-oligosaccharides, mixed oligosaccharides, and the like. Polysaccharides include starch from any source, such as wheat, maize, rice, potato, tapioca, etc, including starch fractions or variants such as high-amylose starch or high-amylopectin starch, hydrolysates, etc., gums and other polysaccharides.

Polysaccharides furthermore include other glucans (e.g. pullulan, dextran, alternan, microcrystalline cellulose), xyloglucans (e.g. tamarind), galactans, mannans, glucomannans, especially galactomannans (e.g. guar), fructans (e.g. inulin), arabans, xylans, arabinoxylans, arabinogalactans, galacturonans (including pectins), (hetero)glucuronans (including gellan, xanthan, and the like) etc., as well as combinations thereof.

Preferably, the carbohydrate is a disaccharide, oligo- or polysaccharide. More preferably the carbohydrate is a polysaccharide having an average molecular weight of at least 3,000 Da (DP of at least 20), more preferably at least 10,000 (DP of at least 60), and may be as high as 10 MDa or even up to 100 MDa. The starch or other polysaccharide may be used in its native form, or it may be a polysaccharide derivative, such as carboxymethylated, oxidised, hydroxyalkylated polysaccharide, etc.

The acylating agent is preferably an acid (resulting in the desired ester and water). It may also be an ester of a lower alcohol, such as a $C_1$-$C_8$ alkyl mono-, di- or tri-alcohol, especially a $C_1$-$C_6$ alkyl mono-, di- or tri-alcohol (resulting in the desired ester and the lower alcohol). The acylating agent may also be a di- or tri-ester of the acid and the di- or tri-alcohol. Mixtures, such as an acid and its lower alkyl ester can also suitably be used. The acylating agent may also be an internal ester of a hydroxy acid (lactone).

The acid to be used may be any organic (e.g. carboxylic, sulphonic, phosphonic) or inorganic (phosphoric, boric etc.) acid. Examples of suitable organic acids include:

$C_{2-30}$ fatty acids, in particular $C_4$-$C_{24}$ fatty acids, especially $C_8$-$C_{18}$ fatty acids, which may be saturated or mono- or poly-unsaturated; specific examples are butyric, sorbic, octanoic (capric), lauric, oleic, stearic acid etc, and also mixtures such as coconut fatty acids;

hydroxy-substituted acids such as glycolic, lactic, glyceric, gluconic, saccharic, lactobionic acid (and other sugar-derived acids), ascorbic, ricinoleic acid, etc.;

$C_{2-18}$ amino-substituted acids, such as glycine, and N-methylated forms thereof (sarcosine, dimethylglycine, especially betaine), alanine, β-alanine, serine, threonine, aspartic acid, glutamic acid, glutamine, phenylalanine, tyrosine, etc. When using amino-substituted acids, such as glycine and betain, it is preferred to use the neutral (or zwitterionic) form, rather than the acid addition form;

$C_2$-$C_{18}$, in particular $C_3$-$C_{12}$ diacids and polyacids, such as succinic, malic, tartaric, maleic, fumaric, glutaric, citraconic, adipic, muconic, sebacic, dodecanedioic, thapsic acid, phthalic acid, citric acid etc. as well as di- and polyacids containing heteroatoms, such as oxydiacetic acid, nitrilotriacetic acid, ethylenediamine-tetraacetic acid and the like; diacids are preferred over tri- and higher acids;

aromatic, especially aryl-substituted alkanoic or alkenoic acids such as benzoic, phenylacetic, cinnamic, hydrocinnamic, and more in particular hydroxy-substituted aromatic acids such as hydroxybenzoic (including salicylic), gallic, vanillic, ferulic, caffeic acid etc.;

the acid may also be a functional group of the same or another carbohydrate, such as a uronic acid group or carboxymethyl group;

the acid may also be added as a mixture of the acid and salts thereof.

Mixtures of acids, including mixtures of organic acids and mixtures of one or more organic acids and one or more inorganic acids, can also suitably be used. A suitable example is a mixture of 5-99 wt % especially 80-98 wt % of organic acid and 1-95 wt %, especially 2-20 wt % of an inorganic acid.

Diacids and polyacids, are especially suitable for crosslinking polysaccharides and for introducing negative charges. Amino acids, in particular quaternised amino acids such as betaine are highly suitable for introducing cationic charges into the polysaccharide, whereas fatty acids are useful for producing hydrophobised polysaccharide derivatives and the like. Amino groups are suitable for further modification such as enzymatic coupling to proteins.

Where the agent is reactively volatile, such as $C_{2-6}$ organic acids, unreacted agent can be condensed downstream of the steam treatment and be recycled to the process.

Especially preferred acids are $C_8$-$C_{24}$ fatty acids, hydroxy-substituted aromatic acids, such as ferulic acid, $C_4$-$C_{10}$ diacids, and phosphoric acid. In a particular embodiment, the acids are food-grade acids, such as propionic, lactic, malic, tartaric, succinic, adipic, citric, ascorbic, erythorbic, gallic acid, etc.

Where the acylating agent is an acid, this is understood to be the acid as such, not a salt form thereof. Thus, the reaction product of the esterification of the invention is the ester with water, not a salt. Consequently, the esterification reaction of the invention is carried out in the substantial absence of a base, i.e. the acid is not in its anionic form, or only partly so. Partly in the anionic form means less than 55% of the (carboxylic) acid groups being in the anionic form preferably less than 40%, more preferably less than 25%. When the acid is a tri- or higher acid, or if the acid is too acidic, such as amino acids in their protonated form, it is advantageously to have certain degree of neutralisation, i.e. at least 20% of the (carboxylic) acid groups being in the anionic form, preferably at least 33%. When the acid is an amino acid, it is especially preferred that the acid is largely (i.e. more than 50%) in its zwitterionic (neutral) form.

The amount of acylating agent in step (a) is preferably 0.01-0.6 mole per mole per mole of glycosyl unit of the carbohydrate, more preferably 0.03-0.3 mole/mole.

The process of the invention is preferably carried out by first adding the agent to the carbohydrate, such as starch. If another carbohydrate than starch is used, or another agent than an acid is used, the description below is the same, even though only starch is mentioned as the carbohydrate and an acid is mentioned as the agent.

The polysaccharide and the acid may be mixed in dry form, or the acid may be added as a solution to dry or dissolved or slurried polysaccharide. Also, the acid can be added in dry form to a hydrated or dissolved carbohydrate.

Also an organic cosolvent, such as ethanol, may be used to mix the acid and the polysaccharide. If the acid is added as an aqueous or organic solution, the combination is preferably dried subsequently to a water content of below 40%, preferably below 30%, at the moment when the steam treatment starts, in order to prevent gelatinisation in the following acylating step. In case of starch, the preferred water content at temperatures above 65° C. is preferably below 10%. The maximum water content applies at the beginning of step c) of the process of the invention. This means that the water content can be higher when heating is started, provided that the maximum water content (preferably of 40% or lower) is achieved when a temperature of 100° C. is reached, or preferably at lower temperature e.g. 65° C. and/or the steam treatment of the carbohydrate starts. Absolute dryness of the mixture of acid and polysaccharide is not necessary. During the steam treatment, the water content is preferably between 0.1 and 10 wt. % (based on the carbohydrate), more preferably between 0.2 and 5 wt. %.

The superheated steam to be used in the process of the invention means steam having a water vapour pressure p which is below the pressure of saturation p* at the same temperature, or which has a temperature T which is above the temperature of water saturation T* at the same pressure. The degree of saturation can be expressed as p/p*. Subjecting to superheated steam according to the invention means that the superheated steam is continuously or semi-continuously fed to the reaction mixture containing the carbohydrate and the acylating agent, thus providing essentially sustained superheated steam conditions during the process. This allows the $A_W$ content (water activity) to be controlled and to be kept essentially constant during the esterification process.

The superheated steam may also contain gasses like air, nitrogen or carbon dioxide. The water present in the superheated steam may be introduced by a steam source. An excess of water may be removed by external condensation.

The temperature during the steam treatment (step c) is preferably at least 100° C., more preferably at least 105° C., more preferably at least 110° C., especially at least 120° C. up to e.g. 200° C., preferably up to 180° C., more preferably up to 160° C. The degree of saturation of the steam is below 100%, i.e. below 98%, preferably below 95%, more preferably below 90%, most preferably below 80%. It can be as low as 1%, preferably it is at least 10% or even at least 20%, more preferably at least 30%. The steam treatment is performed for a period which is sufficient to attain the desired degree of substitution with the acyl groups. In general, the treatment can be continued for between 1 min and several, e.g. 6 h or even up to 10 h. Preferably, the treatment period is between 5 min and 4 h, more preferably between 10 and 120 min. During the steam treatment, the water content of the mixture is kept above the preferred minimum of at least 0.1% or 0.2% or even 0.5%, based on the carbohydrate.

The process may be carried out in a steam dryer but also in any equipment suitable for controlling the reaction conditions. These conditions include the desired temperature, pressure and moisture content but also sufficient mixing and contact between solid material and gas/steam. Examples are (optionally adapted) rotary screw conveyors, paddle mixers and, preferably, fluidised bed reactors.

The process of the invention results in a starch (or other carbohydrate) derivative having one or more substituents. The degree of substitution is determined by the ratio of acylating agent to starch used in the process, and by the process conditions. A degree of molar substitution (DS) of between 0.001 and 1 or even higher, up to 2 (2 acyl groups per starch glycosyl unit) can be obtained. The preferred DS depends on the particular use of the acylated polysaccharide. For food applications, a degree of substitution of between 0.001 and 1.0, preferably between 0.005 and 0.5 (0.5-50%), most preferably between 0.01 and 0.2 (1-20%) is generally preferred.

The invention also relates to the acylated starch (or other polysaccharide) derivates that can thus be produced. In particular, the starch derivative has a degree of substitution for acyl groups of between 0.005 and 0.20, especially between 0.01 and 0.1, the acyl groups being selected from acyl groups having between 4 and 24 carbon atoms, and nitrogen-containing acyl groups.

The products to be obtained according to the invention advantageously have a low metal salt content without a specific desalting step being necessary. Especially, the salt content is less than 20 mole % of the acyl content. A metal salt as used herein refers to common salts resulting from acylation, including alkali metal, alkaline earth metal and other bivalent (zinc, etc.), and ammonium salts, such as halides, sulphates, nitrates, acetates and other carboxylates, etc. Ammonium salts herein are understood to be separate ammonium salts such as $NH_4Cl$, mono-, di-, tri and tetra-alkyl ammonium salts and the like. Any counterions accompanying acylated carbohydrate products having a charged group, such as an ammonio group, are not considered herein to be a metal salt (or ammonium salt) for the purpose of defining low salt content.

The products of the invention when derived form polysaccharides are characterised by a very low degree of depolymerisation (chain degradation). In particular, the molecular weight is at least 25% of the molecular weight of the parent polysaccharide, in particular at least 50%. For acylated starches, the molar weight, at a degree of acyl substitution of between 0.01 and 0.20, is preferably at least 700 kDa, more preferably at least 1 MDa.

Specific acylated products of the invention are those having, per glycosyl group, between 0.005 and 0.20, especially between 0.01 and 0.1 of one or more $C_3$-$C_5$, $C_4$-$C_6$, $C_7$-$C_{11}$, $C_{12}$-$C_{15}$, and $C_{20}$-$C_{24}$ acyl (alkanoyl) groups, such as butyryl, pentanoyl, hexanoyl, heptanoyl, octanoyl, nonanoyl, decanoyl, undecanoyl, dodecanyl, tetradecanoyl, eicosanoyl docosanoyl, tetracosanoyl, and their mono-, di- and poly-unsaturated and hydroxylated analogues. Other specific acylated carbohydrates are those having, per glycosyl group, between 0.005 and 0.20, especially between 0.01 and 0.1 carboxy-substituted $C_2$-$C_{18}$ acyl groups, in particular $C_3$-$C_5$, $C_7$-$C_{11}$, $C_{12}$-$C_{15}$, and $C_{16}$-$C_{18}$ mono- or dicarboxyalkanoyl groups, such as malonyl, glutaroyl, citroyl, suberoyl, pimeloyl, suberoyl, azelaoyl, sebacoyl, carboxyundecanoyl, campheroyl, and their mono- and di-unstuarated and hydroxylated analogues.

Further product according to the invention are polysaccharides which contain between 0.005 and 0.20, particularly between 0.01 and 0.1 acyl groups containing a negative or positive charge, in particular groups having one or more of the formulas:

—C(═O)-A—(COO⁻)$_n$, —(═O)-A—(COOH)$_n$,
—C(═O)-A—NR$^1$R$^2$ and
—C(═O)-A—(NR$^1$R$^2$R$^3$)$^+$, wherein A is an optionally substituted $C_1$-$C_{22}$ hydrocarbon group, optionally interrupted by one or more oxygen (—O—), sulphur (—S—), or imino (—NR$^1$—), wherein $R^1$ and $R^2$ are independently hydrogen, $C_1$-$C_{18}$ alkyl, aryl or aralkyl, or $C_1$-$C_6$ alkyl substituted with hydroxyl, carboxy or optionally substituted amino and $R^3$ is independently hydrogen or $C_1$-$C_6$ alkyl.

Other specific products of the invention have groups of the formula —C(═O)-A—R$^5$, wherein R$^5$ is a (or the same) carbohydrate; these products are useful as crosslinked carbohydrate products. In these products, A can have the same meaning as above. In particular, A may be methylene, resulting in a carboxymethylated carbohydrate as the acylating agent, or it may be part of the carbohydrate itself, such as in uronic acids, e.g. 6-carboxy starch.

Also according to the invention, biopolymers, e.g. starch (derivatives), can be obtained that contain hydroxysubstituted aromatic acids (e.g. ferulic acid) with a degree of substitution (DS) which is sufficient for enzymatic crosslinking. Such biopolymers are highly useful, but relatively rare and more expensive than common starch derivatives. Enzymatic crosslinking of the obtained carbohydrate esters allows e.g. preparation of gels under mild conditions and the development of food components and additives. Such products have an increased stability and can also be used for delivery vehicles. The acids to be used for this purpose are especially hydroxyl-substituted aromatic acids, having the formula HO-Ph-A-COOH, wherein Ph is a phenyl group, optionally further substituted with one, two or three substituents preferably selected from methyl, hydroxy, methoxy and ethoxy, and A is a direct bond, or a $C_1$-$C_3$ alkylene or alkenylene group. Suitable examples include hydroxybenzoic acids, vanillic acid, hydroxyphenylacetic acid, hydroxyphenyl-propionic acid, caffeic acid and, especially, ferulic acid. The polysaccharide derivatives esterified with these acids form a particular embodiment of the invention.

Also, the invention allows the production of biopolymers, e.g. starch (derivatives) that contain quaternary amino groups (e.g. betaine). These products can be used to replace quaternary starch obtained with trimethylglycidylammonium (or the chlorohydrin form) or polyacrylamide polymers for applications like water treatment or improving wet-strength of paper. The quaternary polymers obtained according to the invention are more environment-friendly and can even be produced using only ingredients that are common in food products like starch and betaine.

Derivatisation of starch with adipic acid is currently done with a mixture of adipic acid and acetic anhydride. This also results in acetylation of the starch. The invention allows the preparation of biopolymers such as starch that are substituted and/or crosslinked with adipic acid, without the use of acetic anhydride. This results in a product with less impurities (salts and acetic acid) and the option to omit acetylation. Thereby stabilised starch can be produced with a better digestibility.

EXAMPLES

General: In the examples below, the reaction product was analysed after washing 11 times with water/ethanol and water. After alkaline hydrolysis (using NaOH) the content of covalently bound acid was determined using HPLC-UV

Example 1

Potato starch (250 g) was dried overnight at 95° C. The starch was cooled down below 60° C., and a solution of adipic acid (45 g in 75 ml water/75 ml ethanol) was added. After homogenisation, the mixture was dried at 58° C., until constant weight. Then 250 ml of water was added and the homogenised mixture was dried again at 58° C. This resulted in an adipic acid content of 0.22 mol/mol glycosyl unit. The powder of adipic acid loaded starch (50 g) was treated with superheated steam of 120° C. and 50% saturation at 1 bar for 30 min. The content of covalently bound adipic acid was found to be 0.6 mol %.

Example 2

Potato starch (250 g) was added to a solution of 150 g adipic acid in 250 ml water/250 ml ethanol at a temperature of 47° C. The suspension was stirred during 1 hour at a temperature of 55° C. The loaded starch was filtrated and dried at 58° C. The content of adipic acid was 0.25 mol/mol glycosyl unit. The powder of adipic acid loaded starch (50 g) was treated with superheated steam of 120° C. and 50% saturation at 1 bar for 60 min The content of covalently bound adipic acid was found to be 0.7 mol %.

Example 3

The powder of adipic acid loaded starch (50 g), prepared as described in example 2, was treated with superheated steam of 140° C. and 50% saturation at 1.8 bar for 60 min. The content of covalently bound adipic acid was found to be 4.6 mol %.

Example 4

Potato starch (500 g) was dried overnight at 58° C. Then a solution of adipic acid (80.6 g in 220 ml water/215 ml ethanol) with a temperature of 50° C. was added. After homogenisation the mixture was dried at 58° C. The content of adipic acid was 0.21 mol/mol glycosyl unit. The powder of adipic acid loaded starch (50 g) was treated with superheated steam of 140° C. and 27% saturation at 1 bar for 30 min. The content of covalently bound adipic acid was found to be 1 mol %.

Examples 5-10

Example 4 was repeated using the steam treatment conditions and with the results as given in the table below.

| Example | T (° C.) of steam | Saturation (%) | t (min.) | DS (mol %) (adipoyl) |
|---|---|---|---|---|
| 4 | 140 | 27 | 30 | 1.0 |
| 5 | 140 | 27 | 60 | 1.9 |
| 6 | 140 | 27 | 180 | 3.7 |
| 7 | 140 | 27 | 360 | 5.9 |
| 8 | 150 | 21 | 30 | 1.7 |
| 9 | 150 | 21 | 60 | 2.9 |
| 10 | 150 | 21 | 180 | 4.7 |

Example 11

Potato starch (500 g) was dried overnight at 58° C. Then a solution of adipic acid (40.5 g in 220 ml water/215 ml ethanol) with a temperature of 50° C. was added. After homogenisation the mixture was dried at 58° C. The content of adipic acid was 0.11 mol/mol glycosyl unit. The powder of adipic acid loaded starch (50 g) was treated with superheated steam of 140° C. and 27% saturation at 1 bar for 30 min. The content of covalently bound adipic acid was 0.5 mol %. The example was carried out in duplicate.

Examples 12-19

Example 11 was repeated using the steam treatment conditions and with the results as given in the table below.

| Example | T (° C.) of steam | Saturation (%) | t (min.) | DS (mol %) (adipoyl) |
|---|---|---|---|---|
| 11 | 140 | 27 | 30 | 0.5 |
|  | 140 | 27 | 30 | 0.4 |
| 12 | 140 | 27 | 60 | 1.0 |
| 13 | 140 | 27 | 60 | 0.8 |
| 14 | 140 | 27 | 180 | 1.8 |
| 15 | 140 | 27 | 180 | 1.5 |
| 16 | 140 | 27 | 360 | 2.0 |
| 17 | 150 | 27 | 30 | 0.5 |
| 18 | 150 | 27 | 60 | 0.8 |
| 19 | 150 | 27 | 180 | 1.5 |

Example 20

Potato starch (500 g) was dried overnight at 58° C. Then a solution of adipic acid (20.2 g in 220 ml water/215 ml ethanol) with a temperature of 50° C. was added. After homogenisation, the mixture was dried at 58° C. The content of adipic acid was 0.05 mol/mol glycosyl unit. The powder of adipic acid loaded starch (50 g) was treated with superheated steam of 140° C. and 27% saturation at 1 bar for 30 min. The content of covalently bound adipic acid was found to be 0.1 mol %.

Examples 21-26

Example 20 was repeated using the steam treatment conditions and with the results as given in the table below. The average molecular weight of the final product was measured in examples 22 and 24, and found to be >800 kD, showing that the acylated starch has undergone little if any chain degradation.

| Example | T (° C.) of steam | Saturation (%) | t (min.) | DS (mol %) (adipoyl) |
|---|---|---|---|---|
| 20 | 140 | 27 | 30 | 0.1 |
| 21 | 140 | 27 | 60 | 0.2 |
| 22 | 140 | 27 | 180 | 0.5 |
| 23 | 140 | 27 | 360 | 0.7 |
| 24 | 150 | 21 | 30 | 0.2 |
| 25 | 150 | 21 | 60 | 0.3 |
| 26 | 150 | 21 | 180 | 0.6 |

Example 27

Potato starch was dried overnight at 58° C. To 420 g of the dried starch a solution of adipic acid (40.1 g in 220 ml water/215 ml ethanol) with a temperature of 50° C. was added. After homogenisation the mixture was dried at 58° C. The content of adipic acid was 0.11 mol/mol glycosyl unit. The powder of adipic acid loaded starch (50 g) was treated with superheated steam of 140° C. and 50% saturation at 1.8 bar for 60 min. The content of covalently bound adipic acid was found to be 1 mol %. The average molecular weight of the final product was >800 kD, showing that the acylated starch has undergone little if any chain degradation.

Example 28

The powder of adipic acid loaded starch (100 g), prepared as described in example 27, was treated with superheated steam of 140° C. and 50% saturation at 1.8 bar for 60 min. The content of covalently bound adipic acid was found to be 0.9 mol %.

Example 29

The powder of adipic acid loaded starch (200 g), prepared as described in example 27, was treated with superheated steam of 140° C. and 50% saturation at 1.8 bar for 60 min. The content of covalently bound adipic acid was found to be 0.9 mol %.

Example 30

Potato starch (1000 g) was dried overnight at 58° C. Then a solution of adipic acid (160.2 g in 440 ml water/440 ml ethanol) with a temperature of 50° C. was added. After homogenisation the mixture was dried at 58° C. The content of adipic acid was 0.21 mol/mol glycosyl unit. The powder of adipic acid loaded starch (50 g) was treated with superheated steam of 140° C. and 80% saturation at 2.85 bar for 60 min. The content of covalently bound adipic acid was found to be 2.5 mol %.

Examples 31-33

Example 30 was repeated using the steam treatment conditions and with the results as given in the table below.

| Example | Pressure of steam (bar) | Saturation (%) | t (min.) | DS (mol %) (adipoyl) |
|---------|-------------------------|----------------|----------|----------------------|
| 30      | 2.85                    | 80             | 60       | 2.5                  |
| 31      | 1.8                     | 50             | 30       | 1.4                  |
| 32      | 1.8                     | 50             | 60       | 2.4                  |
| 33      | 1.8                     | 50             | 180      | 4.6                  |

Example 34

Potato starch (1000 g) was dried overnight at 58° C. Then a solution of adipic acid (80.1 g in 440 ml water/440 ml ethanol) with a temperature of 50° C. was added. After homogenisation the mixture was dried at 58° C. The content of adipic acid was 0.11 mol/mol glycosyl unit. The powder of adipic acid loaded starch (50 g) was treated with superheated steam of 140° C. and 80% saturation at 2.85 bar for 60 min. The content of covalently bound adipic acid was found to be 1.3 mol

Examples 35-37

Example 34 was repeated using the steam treatment conditions and with the results as given in the table below.

| Example | Pressure of steam (bar) | Saturation (%) | t (min.) | DS (mol %) (adipoyl) |
|---------|-------------------------|----------------|----------|----------------------|
| 34      | 2.85                    | 80             | 60       | 1.3                  |
| 35      | 1.8                     | 50             | 30       | 0.6                  |
| 36      | 1.8                     | 50             | 60       | 0.9                  |
| 37      | 1.8                     | 50             | 180      | 2.1                  |

Example 38

To a solution of 80.2 g adipic acid in 220 ml water/220 ml ethanol with a temperature of 59° C. 505 g starch was added. The suspension was stirred for 1 hour at 60° C. The mixture was dried at 58° C. (and in between homogenised before it was a dry powder). The content of adipic acid was 0.21 mol/mol glycosyl unit. The powder of adipic acid loaded starch (50 g) was treated with superheated steam of 140° C. and 80% saturation at 2.85 bar for 60 min. The content of covalently bound adipic acid was found to be 2.8 mol %.

Examples 39-41

Example 38 was repeated using the steam treatment conditions and with the results as given in the table below.

| Example | Pressure of steam (bar) | Saturation (%) | t (min.) | DS (mol %) (adipoyl) |
|---------|-------------------------|----------------|----------|----------------------|
| 38      | 2.85                    | 80             | 60       | 2.8                  |
| 39      | 1.8                     | 50             | 30       | 1.4                  |
| 40      | 1.8                     | 50             | 60       | 2.9                  |
| 41      | 1.8                     | 50             | 180      | 5.7                  |

Examples 42-43

Cationisation of Starch

Dried potato starch was added to a preheated (55° C.) solution with the required additive (betaine or a mixture of betaine and betaine.HCl) and subsequently stirred at 55° C. for 1 hour. The upper solution was decanted after sedimentation. The product was dried in an oven at 58° C. Then the sample was transferred to the super heated steam pilot. The condition of the super heated steam pilot was humidity 50% at 123° C. for 50 minutes. Then the powder was collected and the degree of substitution measured via washing with water followed by HPLC analysis.

| Example | rel. mole content of betaine | rel. mole content of betaine·HCl | DS (mol %) |
|---------|------------------------------|----------------------------------|------------|
| 42      | 0.24                         |                                  | 2.4        |
| 43      | 0.11                         | 0.14                             | <0.1       |

Example 44

To a solution of 107 g ferulic acid in 220 ml water/220 ml ethanol with a temperature of 59° C. 505 g starch was added. The suspension was stirred for 1 hour at 60° C. The mixture was dried at 58° C. (and in between homogenised before it was a dry powder). The content of ferulic acid was 0.2 mol/mol glycosyl unit. The powder of ferulic acid loaded starch (50 g) was treated with superheated steam of 140° C. and 80% saturation at 2.85 bar for 60 min. After work-up, the content of covalently bound ferulic acid was found to be 0.03.

The invention claimed is:
1. A process for esterifying starch, comprising:
  (a) combining the starch with 0.01-0.6 mole of an acylating agent per mole of glycosyl unit of the starch, wherein the acylating agent is selected from $C_2$-$C_{30}$ fatty acids, hydroxy-substituted aromatic acids, and $C_2$-$C_{18}$ diacids,
  (b) adjusting the moisture content of the combination below 40 wt. %, and
  (c) subjecting the combination to superheated steam having a degree of saturation between 10 and 95% and having a temperature of at least 100° C.,
  wherein an esterified starch is produced having a molecular weight of at least 700 kDa.
2. The process according to claim 1, in which the superheated steam in step (c) has a degree of saturation between 20 and 90%.
3. The process according to claim 1, in which the superheated steam in step (c) has a temperature of between 105 and 200° C.

4. The process according to claim 1, in which step (c) is continued for a time of between 1 and 360 min.

5. The process according to claim 2, in which the superheated steam in step (c) has a degree of saturation between 30 and 80%.

6. The process according to claim 3, in which the superheated steam in step (c) has a temperature of between 110 and 180° C.

7. The process according to claim 4, in which the combination is subjected to step (c) for a time of between 10 and 240 min.

8. The process according to claim 7, in which the combination is subjected to step (c) for a time of between 20 and 120 min.

9. The process according to claim 1, in which the esterified starch has a molar weight of at least 800 kDa.

* * * * *